ary of United States Patent Office

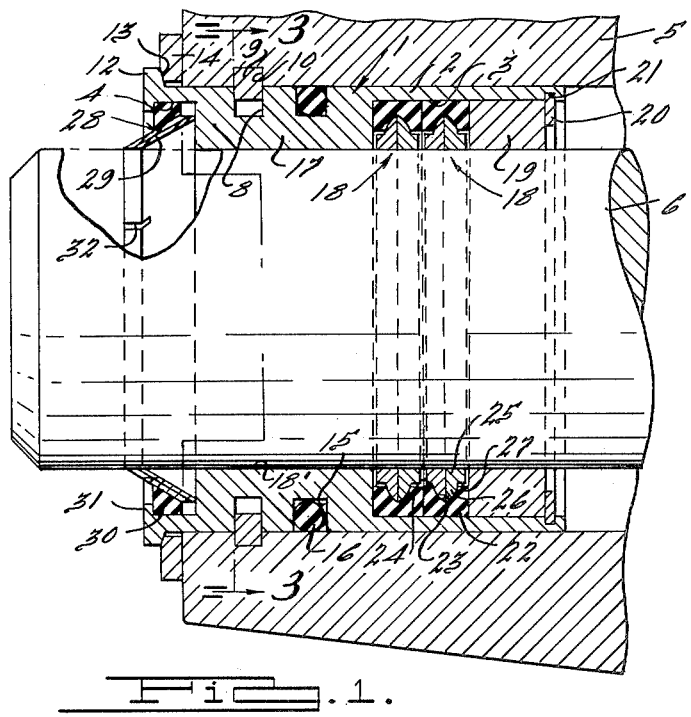
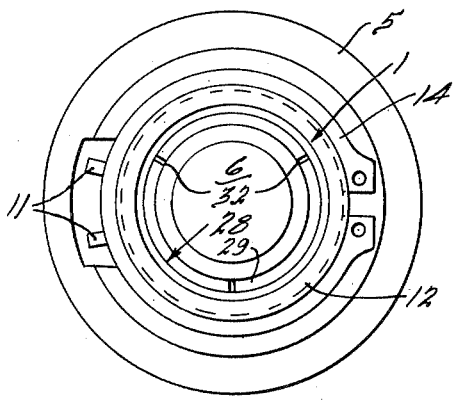
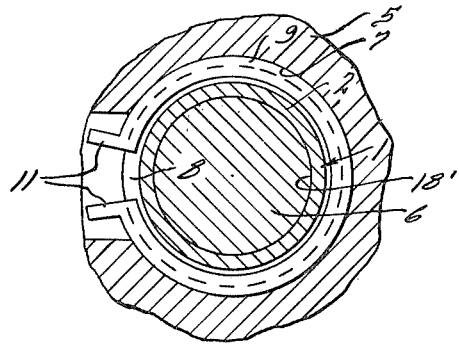

2,707,135
CARTRIDGE SEAL

John C. Monahan, Detroit, Mich., assignor to Hydraulic Accessories Company, Van Dyke, Mich., a partnership Application February 1, 1952, Serial No. 269,398

4 Claims. (Cl. 308—3.5)

This invention relates to fluid pressure seals and particularly relates to replaceable sealing units or cartridges that may be placed or replaced within a supporting housing.

In general there are two types of fluid sealing devices. One type is for retaining fluid under low pressure, or relatively low pressure, such as atmospheric pressure. These are often used on pump drive shafts and other rotating shafts for the purpose of retaining lubricants or excess fluid. The second type is for preventing leakage of fluids under pressure, as, for example, in hydraulic and pneumatic jacks and machine tools. In this type the fluid pressure may range from 0 to 5000 p. s. i. It is to this latter type that the present invention is directed.

In the first type, the sealing devices are constructed without regard to the effect of fluid pressure upon the sealing elements. In the second type, great importance is attached to the effect of fluid pressure since many devices in this type depend upon proper fluid pressure for their proper functioning. It has been common practice in such devices to employ "stuffing boxes" equipped with means for tightening or loosening. In manufacturing practice, the length of the seal is varied by stacking the stuffing elements in the boxes and this varies considerably, making it necessary to use the adjustment means. Where conventional packing glands are used, it is easy for unauthorized personnel to over tighten the packings, causing extreme friction and rapid wear and affecting the operation of the machines with which the packings are employed.

With the device of the present invention, a unit is constructed which may be readily placed or replaced within a supporting member or housing and which engages an operating element, for example, a reciprocating shaft. The replaceable unit is in the form of a metal cylindrical member having a pair of longitudinally spaced internal cylindrical pockets which are separated by an intermediate internal portion of smaller diameter. The sealing and bearing units are placed within one of these pockets and the stacked height may be pre-determined for a particular operation by selecting the proper number of units. A bushing is disposed within this same pocket adjacent the outer end and abutting the adjacent sealing unit, and means are provided for holding the sealing units and the bushing in place. A combined seal guard is positioned within the other pocket and held therein. This unit is designed to the particular sealing requirements and when installed insures proper bearing for the cooperating moving part and proper sealing of the fluid under pressure.

One of the primary objects is to provide a sealing unit which requires no adjustment in use and which may be installed or replaced without skill, thus substantially reducing service cost.

Another object of the invention is to provide a sealing unit which cannot be tampered with and therefore which after being installed will insure proper functioning of the device or machine in which it is employed.

Other objects of the invention will become apparent from the following specification, the drawing relating thereto and from the claims hereinafter set forth.

In the drawing in which like numerals are used to designate like parts in the several views throughout:

Figure 1 is a longitudinal, cross-sectional view of a replaceable fluid pressure sealing unit embodying features of the present invention and illustrating by broken lines its application to a housing and support for a movable rod, for example, a piston rod;

Fig. 2 is an end elevational view of the structure shown in Fig. 1; and

Fig. 3 is a cross-sectional view taken substantially along the line 3—3 of Fig. 1.

Referring to the drawing, a replaceable fluid sealing unit or cartridge is generally indicated at 1 and comprises a metal, cylindrical member 2 having an internal cylindrical pocket 3 formed therein adjacent one end and an internal cylindrical pocket 4 formed therein adjacent the opposite end. The unit 1 is adapted to be positioned within a complementary bore formed in the end of a housing 5 and held therein in a manner to be described hereinafter. A shaft 6 is supported within the bearing unit 1 and such shaft 6 is a movable operating element of a fluid pressure actuated device or machine and may be of the reciprocating or rotating or reciprocating and rotating types. At any event, it will be understood that the shaft 6 is actuated by fluid under pressure with the problem of fluid escape along the shaft and past the bearing and sealing unit employed with it. The unit is such that the shaft will be properly supported without binding but escape of the fluid under pressure will be prevented.

The cylindrical member 2 is formed with an annular groove 8 within which a snap ring 9 is positioned. The snap ring 9 is received within a complementary groove 10 formed in the internal bore of the housing 5, and the ends 11 of the snap ring 9 project through a suitable opening in the wall of the housing 5 so that they are readily accessible. The snap ring 9 thus holds the unit within the housing against axial displacement.

The member 2 is also formed with an outwardly directed annular flange 12 having a tapered wall 13. Another snap ring 14 is adapted to be positioned between the flange 12 and the adjacent face of the housing 5. Such snap ring has a taper adjacent the flange 12 which is complementary to the taper 13. The angle of the taper is such that, within manufacturing tolerances, and when in the position shown in Fig. 1, blacklash is eliminated.

Another annular groove 15 is formed in the periphery of the member 2 inwardly of the groove 8 and a rubber O-ring 16 is disposed within the groove 15 and serves to prevent leakage along the peripheral wall of the member 2 between it and the complementary bore in the housing 5. The pockets 3 and 4 of the member 2 are separated by an internal intermediate portion 17 which is of smaller internal diameter than the pockets and with an inner cylindrical wall 18' which serves as a bearing support for the shaft 6.

Combined seal and bearing units 18 are disposed within the pocket 3, there being two in the embodiment illustrated, with the innermost unit abutting against the adjacent annular wall of the intermediate portion 17. A spacer may be interposed therebetween if desired. Also, after determining the proper stacked height for a particular unit, the proper number of such units 18 may be employed. The units 18 are stacked within the pocket and a bronze bushing 19 is disposed within the pocket 3 adjacent the outer end and bearing against the adjacent unit 18. The bronze bushing 19 is of substantially the same internal diameter as the intermediate portion 17 and also serves to support the shaft 6.

The units 18 and bushing 19 are held in place and against axial displacement by means of a snap ring 20 which is received within an internal annular groove 21 formed in the member 2 adjacent the outer end and bears against the adjacent face of the bushing 19.

The combined units 18 are preferably of the type disclosed and claimed in John C. Monahan Patent No. 2,557,835 and comprise an elastically deformable outer cushioning ring 22 having an internal groove 23 therein which opens into an inner periphery 24. An inner sealing and bearing ring 25 of suitable bearing metal has an outer periphery 26 which fits within the groove 23. The ring 25 is preferably formed with annular shoulders 27 which are spaced slightly from the periphery 24 when the assembly is unstressed. It is also preferably split longitudinally to provide for radial compression. The inner peripheral annular faces of ring 25 thus engage the periphery of the shaft 6 and provide an effective bearing and seal against fluid leakage.

A seal guard unit generally indicated at 28 is disposed within the pocket 4 and such unit 28 is illustrated as of the type shown in the copending application of John C. Monahan, Serial No. 98,987, filed June 14, 1949, and issued April 7, 1953, as Patent No. 2,634,145, and is preferably of that type. Such unit 28 comprises a frusto-conical member 29 of resilient metallic material and a non-metallic yieldable backing member 30 which engages a portion only of the outer surface of the member 29. The backing member 30 has an inner face complementary in shape to the external surface of the frusto-conical member and has an outer annular surface substantially cylindrical in form. The outer annular surface engages the wall of the pocket 4 and the member 2 is preferably formed with an inwardly directed annular flange 31 which engages the adjacent face of the member 30 to mount the unit 28 in position. The members 29 are preferably formed with axially extending slots 32 formed through the smaller end thereof at spaced points therearound. A plurality of such members 29 may be nested within each other with such slots offset.

The unit 1 forms a complete unit having the unit 28 and the bearing seal 18 and the bushing 19 mounted therein as an assembly. It will be appreciated that it may be very easily mounted in its proper place, as in the bore of the housing 5, and after being so mounted futher adjustments are not required and cannot be made, so that the device or machine with which it is employed will function properly with the moving parts properly supported and sealed against the leakage of fluid under pressure.

Formal changes may be made in the specific embodiment of the invention described without departing from the spirit of the invention, the scope of which is commensurate with the appended claims.

What is claimed is:

1. A replaceable fluid pressure sealing unit removably positioned within the complementary bore of a housing, said sealing unit comprising a cylindrical member having an outwardly-directed annular flange formed at one end, means forming an outwardly-directed taper on the inner wall of said flange tapering away from the adjacent face of the housing, means forming an interior cylindrical pocket in one end of said member, a seal unit mounted within said pocket, means securing said last-named unit in said pocket, and means for removably mounting said sealing unit within the complementary bore, said last-named means comprising complementary annular grooves formed in said bore of said housing and in the periphery of said cylindrical member, a removable snap ring received within said grooves, and another removable snap ring received between, and engageable with, said inner wall of said flange and the adjacent face of said housing.

2. A replaceable fluid pressure sealing unit removably positioned within the complementary bore of a housing, said sealing unit comprising a cylindrical member having an outwardly-directed annular flange formed at one end, means forming an outwardly-directed taper on the inner wall of said flange tapering away from the adjacent face of the housing, means forming a first interior cylindrical pocket in one end of said member, means forming a second interior cylindrical pocket in the other end of said cylindrical member, a combined seal and bearing unit mounted within said first pocket, means securing said last-named unit in said pocket, a seal guard unit mounted within said second pocket, said guard unit comprising a frusto-conical member of resilient metallic material and a non-metallic yieldable backing member engaging a portion only of the outer surface of said frusto-conical member, and said backing member engaging the peripheral wall of said second pocket, and means securing said guard unit within said second pocket, and means for removably mounting said sealing unit within said complementary bore, said last-named means comprising complementary annular grooves formed in said bore of said housing and in the periphery of said cylindrical member, a removable snap ring received within said grooves, and another removable snap ring received between, and engageable with, said inner wall of said flange and the adjacent face of said housing.

3. A replaceable fluid pressure sealing unit removably positioned within the complementary bore of a housing, said sealing unit comprising a cylindrical member having an outwardly-directed annular flange formed at one end, means forming an outwardly-directed taper on the inner wall of said flange tapering away from the adjacent face of the housing, means forming a first interior cylindrical pocket in one end of said member, means forming a second interior cylindrical pocket in the other end of said cylindrical member, an internal intermediate portion of said cylindrical member of smaller internal diameter than said pockets and separating said pockets, a combined seal and bearing unit mounted within said first pocket, a bushing mounted within said first pocket adjacent the outer end and bearing against the adjacent combined unit, means securing said combined unit and said bushing in said pocket, a seal guard unit mounted within said second pocket, said guard unit comprising a frusto-conical member of resilient metallic material and a non-metallic yieldable backing member engaging a portion only of the outer surface of said frusto-conical member, and said backing member engaging the peripheral wall of said second pocket, and means securing said guard unit within said second pocket, and means for removably mounting said sealing unit within said complementary bore of said housing, said last-named means comprising complementary annular grooves formed in said bore of said housing and in the periphery of said cylindrical member, a removable snap ring received within said grooves, and another removable snap ring received between, and engageable with, said inner walls of said flange and the adjacent face of said housing.

4. An integral cartridge type packing gland assembly for replaceable use in a pressure cylinder head and piston rod assembly characterized by a main cylindrical body adapted to fit within the cylindrical bore of a cylinder head, inner cylindrical bearing and housing portions coaxial with the outer cylindrical surface of said main body, a packing element within said housing portion adjacent said bearing portion, a bushing within said housing portion adjacent said packing element, an external shoulder at one end of said body, a pair of adjacent grooves in the outer cylindrical surface of said body within the axial extension of said bearing portion, a resilient sealing ring in one of said grooves, and a snap ring adapted to be totally compressed within the other of said grooves.

References Cited in the file of this patent

UNITED STATES PATENTS

| | | |
|---|---|---|
| 2,075,645 | Hamilton | Mar. 30, 1937 |
| 2,390,445 | Mercier | Dec. 4, 1945 |
| 2,493,602 | Sterrett | Jan. 3, 1950 |
| 2,509,151 | Kasten | May 23, 1950 |
| 2,533,531 | Stephens | Dec. 12, 1950 |
| 2,557,835 | Monahan | June 19, 1951 |